United States Patent

[11] 3,561,801

| [72] | Inventor | Joseph Chak Fai Chiu<br>Kowloon, Hong Kong |
|---|---|---|
| [21] | Appl. No. | 861,076 |
| [22] | Filed | Sept. 25, 1969 |
| [45] | Patented | Feb. 9, 1971 |
| [73] | Assignee | Chiu's Joint System Limited<br>Tai Wai, Shatin, New Territories, Hong Kong, Japan |
| [32] | Priority | June 2, 1969 |
| [33] | | Great Britain |
| [31] | | 27836/69 |

[54] SPRING TUBE CONNECTING MEMBER
12 Claims, 14 Drawing Figs.

[52] U.S. Cl. .................................................. 287/189.36,
52/475, 52/656, 52/665, 287/54
[51] Int. Cl. .................................................. F16b 7/18
[50] Field of Search........................................ 287/189,
36H, 54A, 54B, 54C, 20.92C, 119, 126; 52/665,
285 (Cursory), 656, 235, 475; 108/(Inquired);
297/(Inquired); 312/(Inquired)

[56] References Cited
UNITED STATES PATENTS

| 2,703,157 | 3/1955 | Goldberg.................... | 287/54BX |
| 2,941,855 | 6/1960 | Weill........................ | 287/189.36HUX |
| 3,089,716 | 5/1963 | Berkowitz.................. | 287/189.36HX |
| 3,347,509 | 10/1967 | Holz et al.................. | 287/54AX |
| 3,357,149 | 12/1967 | Johnston................... | 287/189.36HX |
| 3,434,748 | 3/1969 | Leurent..................... | 287/56X |
| 3,462,893 | 8/1969 | Kaiser...................... | 287/54B |

FOREIGN PATENTS

| 441,871 | 1/1968 | Germany.................... | 287/546 |

Primary Examiner—David J. Williamowsky
Assistant Examiner—Wayne L. Shedd
Attorney—Cushman, Darby & Cushman

ABSTRACT: A constructional unit for connecting together hollow tubes includes a first connecting member with a base portion and an insert portion having flanged prongs, the free ends of the prongs facing each other and formed to define a threaded bore when compressed together. The second connecting member has a common base for two insert portions of the type the first connecting member has. The base portions are apertured and a three-dimensional, easily demountable and assemblable constructional system can be built up.

PATENTED FEB 9 1971

Inventor
Joseph Chak Fai Chiu
By
Cushman, Darby & Cushman
Attorneys

SPRING TUBE CONNECTING MEMBER

This invention concerns a connecting member for connecting together two or more hollow tubes, and a construction unit utilizing such a connecting member.

According to one aspect of the present invention, there is provided a connecting member for connecting together two or more hollow tubes each of which is provided with an opening for the passage of a fastener element therethrough, said connecting member comprising a base portion, and an insert portion which is secured to said base portion and which is adapted to be inserted into a said hollow tube, the insert portion having two substantially parallel prongs which terminate in respective oppositely facing flanges, and having a maximum cross section which is somewhat larger than the internal cross section of the hollow tubes, the said flanges being such that their free ends are normally slightly spaced apart, but when they are compressed towards each other the insert portion may be inserted into one of said hollow tubes and the said free ends define therebetween a bore which is alignable with the opening in said one tube for the passage of a fastener element through said opening and said bore.

The connecting member is preferably substantially rectangular in section with the oppositely facing flanges constituting one of the sides which is parallel with the said base portion.

The said base portion and the said insert portion may be formed of aluminum.

Preferably the said base portion and the said insert portion form a unitary structure.

The said base portion may be provided with a hole which is alignable with the opening in a said tube, or with an opening defined between the respective openings of two of said tubes placed side-by-side.

Advantageously, the axis of the hole in the said base portion is substantially at right angles with the axis of the bore defined between said flanges.

Said bore is preferably a threaded bore.

The said connecting member may have a common base portion to which are secured two of said insert portions.

The said insert portions may extend substantially at right angles to each other.

The invention also includes a constructional unit comprising two or more hollow tubes connected together by means of a connecting member as set forth above and fastener means extending through said hole and aligned opening, and/or through said bore and another aligned opening.

According to another aspect of the present invention there is provided a constructional unit assembly comprising in combination three hollow tubes connected together, two of said tubes having respective beveled ends placed side-by-side and defining therebetween an opening for the passage of a fastener element, each said tube being provided with a further opening, a connecting member as set forth in the ninth and tenth paragraph hereinabove connecting together the said tubes at said beveled ends, the hole in the base portion of said connecting member being aligned with the first-mentioned opening, a further connecting member as set forth above in any of the second to the seventh paragraphs, the hole in the base portion of said further connecting member being also aligned with the first mentioned opening, the insert portion of said further connecting member being inserted into the third of said tubes, the bores of said connecting members being aligned with the further openings of said tubes, the said assembly being held rigidly together by securing fasteners in said openings, bores and holes.

The invention will now be described, merely by way of example, with reference to the accompanying drawings, in which.

Figures 1, 2, 3:
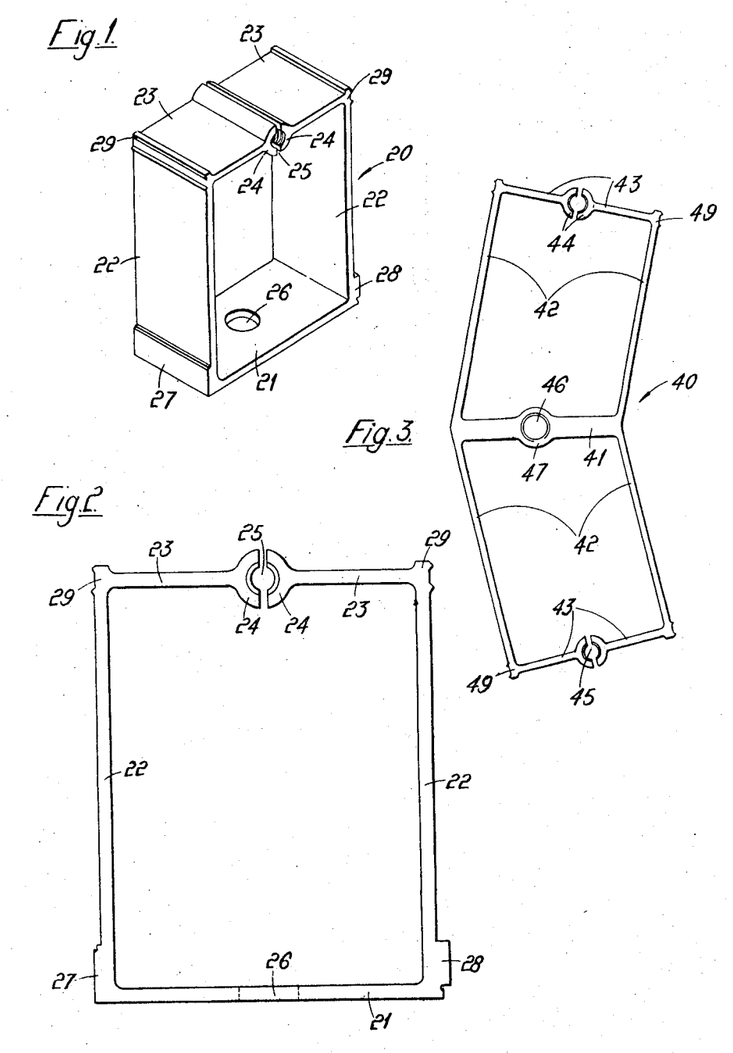
FIG. 1 is a perspective view of a connecting member in accordance with the present invention.
FIG. 2 is a side elevation of the connecting member of FIG. 1, but shown on an enlarged scale.
FIG. 3 is a side elevation of a further connecting member in accordance with the present invention.

Referring to the drawings, there is shown in FIG. 1 a connecting member 20 which is substantially rectangular in section, is of unitary structure and is made of aluminum. The connecting member 20 includes a base wall or portion 21, and an insert portion secured to the base portion 21. The insert portion includes a pair of substantially parallel prongs or sidewalls 22 each of which is substantially at right angles to the base portion 21 and each is formed at its end remote from the base portion 21 with a flange 23 which extends substantially at right angles to the sidewall 22. The respective free ends of the flanges are formed with substantially semicylindrical parts 24, the interiors of which are threaded. Normally, the two oppositely-facing flanges 23 are somewhat spaced apart, but on compressing the sidewalls 22 towards each other, the semicylindrical portions 24 may be brought into contact with each other thereby to define a cylindrical threaded bore 25 therebetween. The material of the connecting member 20 is of sufficient resilience to enable an operator to press the sidewalls 22 together without having to exert undue force.

At the junction of one of the sidewalls 22 with the base portion 21 there is provided an enlargement 27, while the other sidewall 22 is provided with an enlargement 28 which is slightly above the junction of that sidewall with the base portion 21. At the other ends of the sidewalls 22, they are both provided with respective pairs of parallel ribs 29, each rib being substantially V-shaped in profile. The base portion 21 is provided with a substantially central hole 26 adapted for the passage of a fastener therethrough.

Referring now to FIG. 3, there is shown a further embodiment of a connecting member according to the present invention. This connecting member 40 has similarities with the connecting member 20 of FIGS. 1 and 2, and corresponding parts have had their reference numbers increased by 20. The connecting member 40 differs, however, from the connecting member 20 in that to opposite sides of a common base portion 41 are integrally secured two substantially identical insert portions each having a pair of substantially parallel sidewalls 42 terminating in respective flanges 43 extending at right angles to the sidewalls 42. The sidewalls 42 on opposite sides of the common base portion 41 extend at an obtuse included angle which may be, for example, 155°. The common base portion 41 is provided with a substantially central enlarged portion 47 in which is formed a threaded bore 46.

Figure 4:
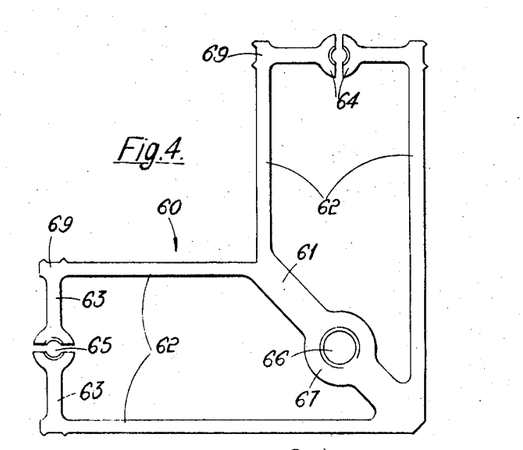
FIG. 4 is a side elevation of a still further connecting member in accordance with the present invention.

Referring now to FIG. 4, there is shown a connecting member which is substantially similar to that shown in FIG. 3 and parts corresponding to those of the connecting member of FIG. 3 have had their reference numbers increased by 20. Thus the connecting member 60 of FIG. 4 differs from the connecting member 40 of FIG. 3 only in that the angle between the insert portions on opposite sides of the common base portion 61 are at right angles to each other, and further description is therefore believed to be unnecessary.

Figure 5:
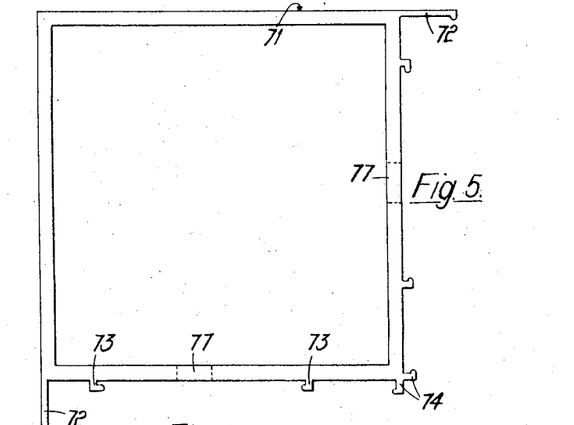
FIGS. 5 to 7 are end views of certain hollow tubes which may be connected together with the connecting members of the preceding FIGS.
Figure 6:
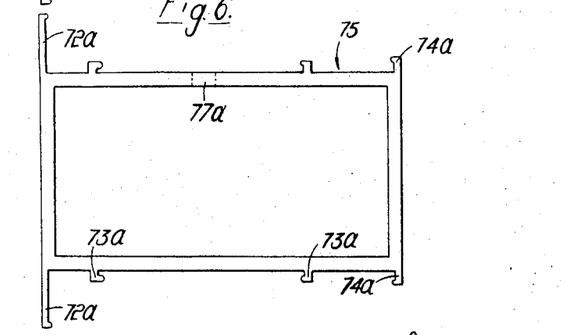
Figure 7:
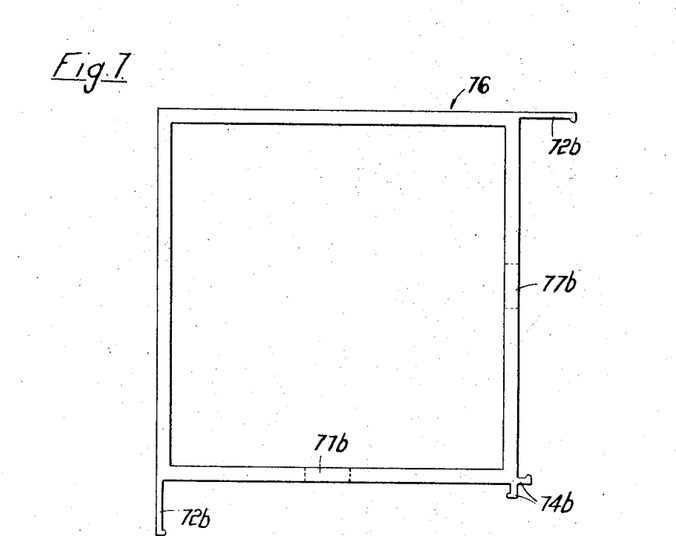

Referring now to FIGS. 5 to 7, there are shown three different hollow tubes which may be connected together by the connecting members described so far and which are also made of aluminum. Thus in FIG. 5 there is shown a hollow tube 71 of substantially square cross section, some of the sides of which are extended by integral flanges which terminate in respective hooks. The longer flanges are denoted by the reference number 72 while the shorter flanges are denoted by the reference number 74. It will be noted that at one particular corner of the tube 71 two flanges 74 are provided at right angles to each other, with the hooks facing away from each other. Moreover, one of the sides of the tube 71 is provided with a pair of integral flanges 73 terminating in hooks which face each other, the flanges 73 being symmetrically located with respect to the transverse axis through that side and are inwardly of the corners. Additionally, at least some of the sides of the tube 71 may be formed with respective openings 77.

The tube 75 of FIG. 6 is substantially similar to the tube 71 of FIG. 5 and corresponding parts have had the suffix *a* added to their reference numbers. However, the tube 75 is rectangular in section and, as can be seen, the disposition of the flanges 72*a* and 74*a* is somewhat different.

The tube 76 of FIG. 7 is substantially similar to that of FIG. 5 and parts corresponding to those of the tube 71 have had the suffix *b* added to their reference numbers. The tube 76 is also of square section, but the tube 76 does not have any flanges such as 73.

Figure 8:
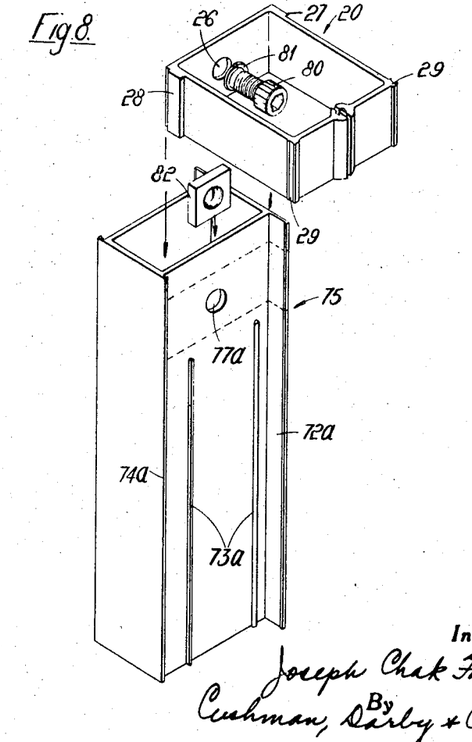
FIGS. 8 to 10 are perspective views showing the steps of making a two-dimensional joint using a connecting member shown in FIGS. 1 and 2 and a pair of hollow tubes as shown in FIG. 6, and FIGS. 11 to 14 are perspective views of the steps of assembly of a three-dimensional constructional unit using a connecting member as shown in FIGS. 1 and 2 and a connecting member as shown in FIG. 4, together with three tubes as shown in FIG. 6 and FIG. 5 or FIG. 7.
Figure 9:
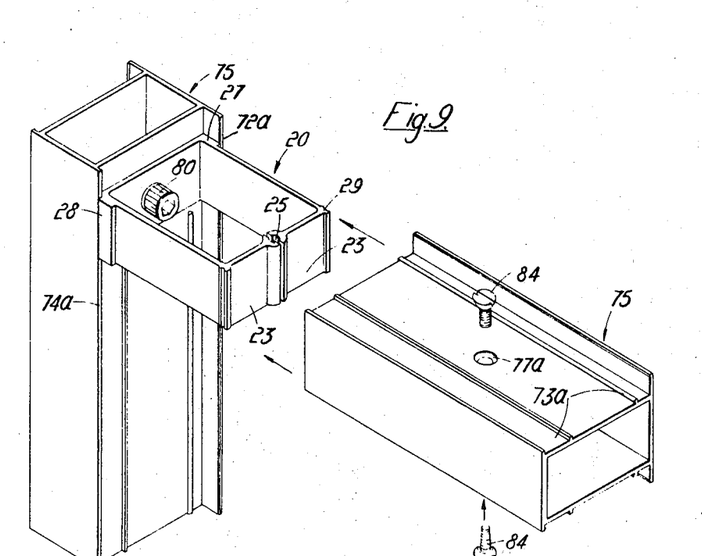
Figure 10:
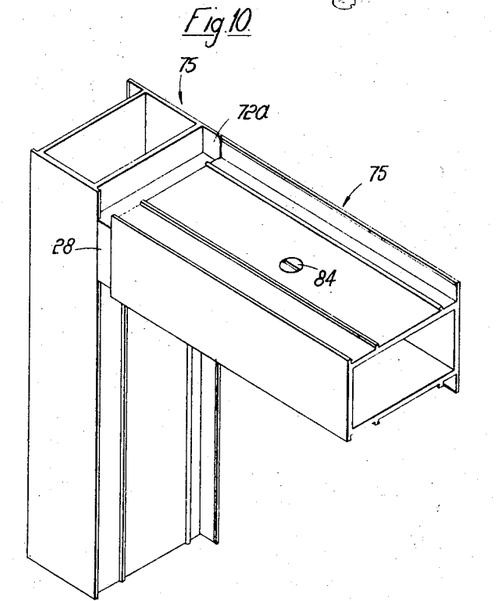
Figure 11:
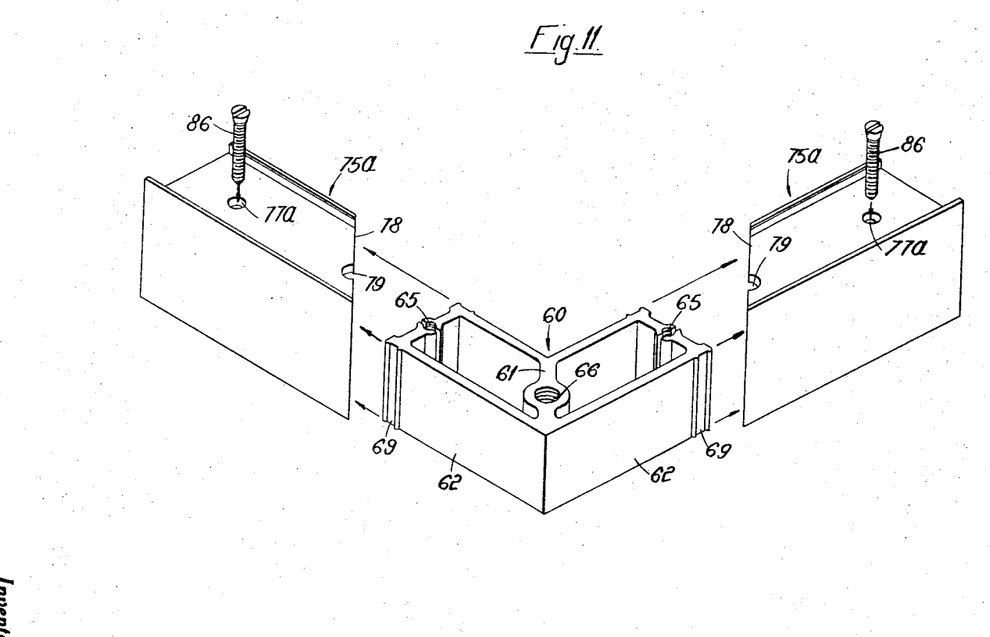

Turning now to FIGS. 8 to 10, there are shown the steps of making a "two-dimensional" tube joint between a pair of tubes 75 with the aid of a connecting member 20. Arrowed chain-dotted lines show on these FIGS. the direction in which certain parts are to be moved during assembly and in FIG. 8 dotted lines show the final position of the base portion 21 of the connecting member 20.

As can be seen, a tube 75 is disposed substantially vertically with a hole 77*a* disposed adjacent one end thereof. This hole 77*a* is brought into registry with the hole 26 in the base portion 21 for the passage of a fastener therethrough. The fastener comprises a bolt 80 which has a round knurled head and a hexagonal internal aperture in the head, and a threaded nut 82 is brought also into registry with the hole 77*a* but at the opposite side to the hole 26. A split washer ring 81 is interposed between the bolt 80 and the base portion 21.

As can be seen in FIG. 9, the enlargement 28 sits on the edge of the flange 74*a*, while the enlargement 27 is in engagement with the width of the flange 72*a*. After the screw 80 has been tightened, the connecting member 20 is ready to be inserted into the hollow interior of another tube 75 so as to form a right-angle joint between the two tubes.

In the normal position, the maximum external dimensions of the connecting member 20 are slightly greater than the internal dimensions of the tube 75. However, on compressing the flanges 23 towards each other, the tube 75 can be received over the insert portion of the connecting member 20, and when the pressure is released, the ribs 29 will engage with the interior surface of the hollow tube 75 to provide a strong frictional engagement by virtue of line contacts of the ribs 29 therewith. In order to secure the second tube 75 more rigidly to the connecting member 20, a pair of screws 84 are provided to pass through opening 77*a* on opposite parallel faces of the tube 75, and these screws 84 will engage and mate with the threads of the threaded bore 25 of the connecting member 20.

It will be observed from FIG. 10 that in the assembled position the enlargement 28 will act as a spacer between the two tubes 25, as will also the flange 72*a*.

It will also be observed that the two tubes 75 in FIGS. 8 and 9 are not exactly identical, in that the tube 75 seen standing vertically in FIG. 8 has its parallel flanges 73*a* terminating short of the length of the tube 75, while the other tube, seen horizontal in FIG. 9, has its flanges 73*a* extending along the full length of that face of the tube 75.

Clearly if it is desired to make a joint between a pair of hollow tubes such that they extend at an angle of 155° rather than 90°, a connecting member 40 of FIG. 3 may be used instead of the connecting member 60 of FIG. 4. If other angles are desired, then the connecting member 40 can be suitably modified.

Referring now to FIGS. 11 to 14, there are shown steps of making a "three-dimensional" constructional unit utilizing the parts shown in FIGS. 1 to 7. Merely by way of example, these FIGS. show the method of constructing a mutually orthogonal "three-dimensional" joint.

Clearly, it is firstly necessary to make a "two-dimensional" joint to extend in the horizontal plane, and for this a connecting member 60 is used. The two tubes to be joined together are substantially similar to the tube 75 of FIG. 6, but they are shown in a modified form and are given the reference number 75*a*. The modification consists of providing one end face of each of the tubes 75*a* with a bevel so that the plane of the beveled end face 78 extends at an angle of 45° to the longitudinal axis of the tube 75*a*. In the center of one of the sides constituting the end face, a semicylindrical opening 79 is formed.

Again, arrowed chain-dotted lines show the steps of assembly and it is believed that very little explanation is necessary. Thus it will be seen from FIG. 11 that each of the tubes 75*a* is provided with an opening 77*a* for the passage of a long screw 86 therethrough, and as can be seen from FIG. 12, when the two tubes 75*a* have been connected together by the passage of the screws 86 through the opening 77*a* and the bores 65, the two semicylindrical openings 79 in the respective beveled faces 78 will constitute together a cylindrical opening 79*a* which will be in registry with the threaded bore 66 in the common base portion 61 of the connecting member 60.

Figure 12:
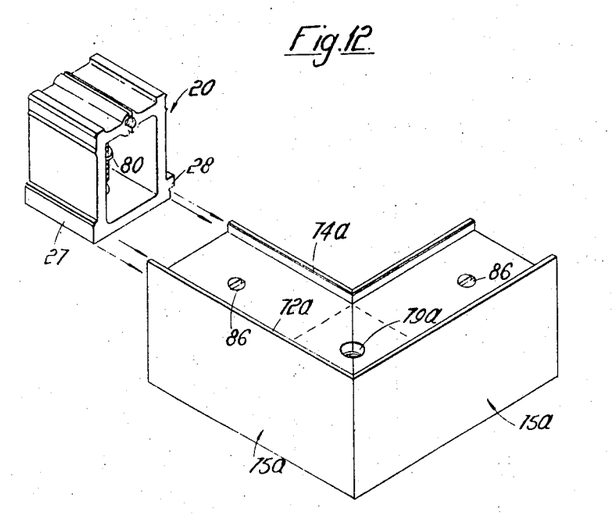
Figure 13:
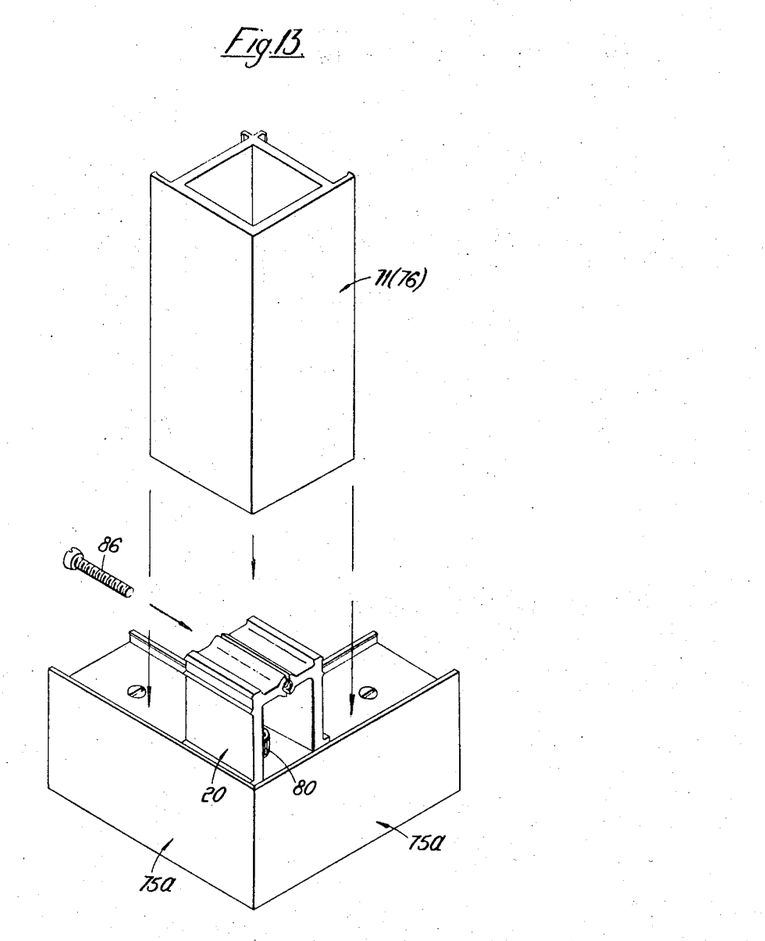

The next step is to build up the "third" dimension of the constructional unit, and this is again shown in FIG. 12 by arrowed chain-dotted lines, utilizing a connecting member 20. The connecting member 20 is slid into the position shown in dotted lines, with its enlargement 27 in frictional engagement with the inner face of the flange 72*a* of the tube 75*a*, and with its enlargement 28 riding over the top of the flange 74*a* of the tube 75*a*. In the final position of the connecting member 20, the hole 26 in its base portion 21 will be in registry with the hole 79*a* and the threaded bore 66. A fastener 80 is now passed through the hole 26 and the opening 79*a* and is screwed into threaded engagement with the threaded bore 66, thereby securing the connecting member 20 in place. Next, a tube such as 71 in FIG. 5 or 76 in FIG. 7 is passed over the connecting member 20 as indicated by arrowed chain-dotted lines in FIG. 13. Again, to enable the tube 71 or 76 to pass over the member 20, the flanges 23 have to be brought into engagement with each other, and once the tube is passed over the connecting member 20, the ribs 29 will engage the interior surface of the tubes 71 or 76 along their axial extent. The tube 71 or 76 is formed with an opening 77 or 77*b* created so as to be in registry with bore 25 so as to enable a long screw 86 to be passed therethrough for threading engagement with the threaded bore 25.

Figure 14:
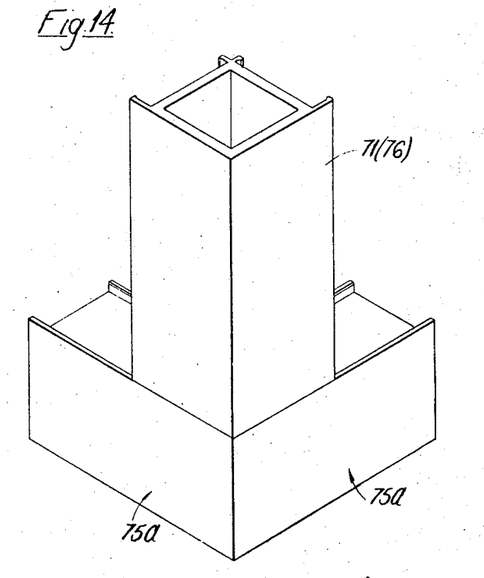

FIG. 14 shows the final assembled state of the three-dimensional constructional unit.

It will be appreciated that the present invention provides a connecting member for connecting together hollow tubes, and a constructional unit or assembly which is of use in architectural designs generally. It can be used for erecting partitions, for furniture assembly and other fields in interior decorating. The invention provides a construction which is light yet rigid, of pleasing appearance and relatively easy to assemble and dismantle. Moreover, the aluminum parts of the constructional unit are capable of sustaining relatively high temperatures.

I claim:

1. A connecting member for connecting together at least two hollow tubes each of which has an opening defined therein for the passage of a fastener element therethrough, said connecting member comprising a base portion, and an insert portion which is secured to said base portion and which is adapted to be inserted into a said hollow tube, the insert portion having two substantially parallel prongs, the prongs having free ends which terminate in respective oppositely facing flanges, the insert portion having a maximum cross section in a direction normal to said prongs which is somewhat larger than the internal cross section of the hollow tubes, the said flanges being such that their free ends are normally slightly spaced apart, but when they are compressed towards each other, the insert portion may be inserted into one of said hollow tubes and the said free ends define therebetween a bore which is alignable with the opening in said one tube for the passage of a fastener element through said opening and said bore.

2. A connecting member as claimed in claim 1 wherein the connecting member is substantially rectangular in section with the oppositely facing flanges constituting one of the sides which is parallel with the said base portion.

3. A connecting member as claimed in claim 1 wherein the said base portion and the said insert portion are formed of aluminum.

4. A connecting member as claimed in claim 1 wherein the said base portion and the said insert portion form a unitary structure.

5. A connecting member as claimed in claim 1 wherein the said base portion has a hole defined therein which is alignable with the opening in a said tube.

6. A connecting member as claimed in claim 1 wherein the said base portion has a hole defined therein which is alignable with an opening defined between the respective openings of two of said tubes placed side-by-side.

7. A connecting member as claimed in claim 5 wherein the axis of the hole in the said base portion is substantially at right angles with the axis of the bore defined between said flanges.

8. A connecting member as claimed in claim 1 wherein said bore is a threaded bore.

9. A connecting member as claimed in claim 1 wherein said connecting member has a common base portion to which are secured two of said insert portions.

10. A connecting member as claimed in claim 9 wherein said insert portions extend substantially at right angles to each other.

11. A constructional unit comprising at least two hollow tubes connected together by means of a connecting member, each tube having an opening defined therein for the passage of a fastener element therethrough, said connecting member comprising a base portion, and an insert portion which is secured to said base portion and which is adapted to be inserted into a said hollow tube, the insert portion having two substantially parallel prongs, the prongs having free ends which terminate in respective oppositely facing flanges, the insert portion having a maximum cross section which is somewhat larger in a direction normal to said prongs than the internal cross section of the hollow tubes, the said flanges being such that their free ends are normally slightly spaced apart, but when they are compressed towards each other, the insert portion may be inserted into one of said hollow tubes and the said free ends define therebetween a bore which is alignable with the opening in said one tube for the passage of a fastener element through said opening and said bore.

12. A constructional unit assembly comprising, in combination, three hollow tubes connected together, two of said tubes having respective beveled ends placed side-by-side and defining therebetween an opening for the passage of a fastener element, each said tube being provided with a further opening, a connecting member connecting together the said two tubes at said beveled ends, the said connecting member comprising a common base portion, and two insert portions which are secured to said base portion and which are adapted to be inserted into respective hollow tubes, the insert portion having two substantially parallel prongs, the prongs having free ends which terminate in respective oppositely facing flanges, the insert portion having a maximum cross section which is somewhat larger in a direction normal to said prongs than the internal cross section of the hollow tubes, the said flanges being such that their free ends are normally slightly spaced apart, but when they are compressed towards each other, the insert portion may be inserted into one of said hollow tubes and the said free ends define therebetween a bore which is alignable with the opening in said one tube for the passage of a fastener element through said opening and said bore, the hole in the base portion of the said connecting member being aligned with the first-mentioned opening, a further connecting member comprising a base portion, and an insert portion which is secured to said base portion and which is adapted to be inserted into a said hollow tube, the insert portion having two substantially parallel prongs, the prongs having free ends which terminate in respective oppositely facing flanges, the insert portion having a maximum cross section which is somewhat larger than the internal cross section of the hollow tubes, the said flanges being such that their free ends are normally slightly spaced apart, but when they are compressed towards each other, the insert portion may be inserted into one of said hollow tubes and the said free ends define therebetween a bore which is alignable with the opening in said one tube for the passage of a fastener element through said opening and said bore, the hole in the base portion of said further connecting member being also aligned with the first-mentioned opening the insert portion of said further connecting member being inserted into the third of said tubes, the bores of said connecting members being aligned with the further openings of said tubes, the said assembly being held rigidly together by securing fasteners in said openings, bores and holes.

UNITED STATES PATENT OFFICE
CERTIFICATE OF CORRECTION

Patent No. 3,561,801     Dated February 9, 1971

Inventor(s) Joseph Chak-Fai Chiu

It is certified that error appears in the above-identified patent and that said Letters Patent are hereby corrected as shown below:

In the heading "[73] Assignee Chiu Joint Systems Limit(
No. 1 Shing Ho Road, Lien Fung
Building, Tai Wai, Shatin, New
Territroties, Hong Kong, Japan"

it should read "[73] Assignee Chiu's Joint Systems Limit(
No. 1 Shing Ho Road, Lien Fung
Building, Tai Wai, Shatin, New
Territories, Hong Kong."

Signed and sealed this 28th day of December 1971.

(SEAL)
Attest:

EDWARD M. FLETCHER, JR.
Attesting Officer

ROBERT GOTTSCHALK
Acting Commissioner of P